United States Patent
Dent et al.

(10) Patent No.: US 6,515,976 B1
(45) Date of Patent: Feb. 4, 2003

(54) DEMODULATION METHOD AND APPARATUS IN HIGH-SPEED TIME DIVISION MULTIPLEXED PACKET DATA TRANSMISSION

(75) Inventors: Paul W. Dent, Pittsboro, NC (US); Santanu Dutta, Research Triangle Park, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/055,491

(22) Filed: Apr. 6, 1998

(51) Int. Cl.[7] .............................. H04J 3/00; H04J 3/06; H04L 27/14; H04M 1/00; H04Q 7/00
(52) U.S. Cl. ................ 370/336; 330/350; 375/324; 455/574; 340/7.32; 340/7.45
(58) Field of Search ................... 370/312, 313, 370/314, 315, 316, 321, 324, 326, 336, 337, 345, 442, 311; 375/136, 137, 133, 134, 143, 147, 149, 150, 151, 152, 153, 324, 338, 340, 202, 344; 455/32.1, 67.1, 38.3, 132, 134, 135, 343, 574, 182.3; 342/357.16, 385; 329/311, 312, 334, 336; 340/7.32, 7.33, 7.34–7.38, 7.42–7.49

(56) References Cited

U.S. PATENT DOCUMENTS

| | | | |
|---|---|---|---|
| 4,507,781 A | * 3/1985 | Alvarez, III et al. | 370/266 |
| 4,586,177 A | 4/1986 | Kaul | |
| 4,726,040 A | 2/1988 | Acampora | |
| 4,928,274 A | * 5/1990 | Gilhousen et al. | 370/326 |
| 4,979,170 A | * 12/1990 | Gilhousen et al. | 370/321 |
| 5,060,266 A | 10/1991 | Dent | |
| 5,089,813 A | * 2/1992 | DeLuca | 455/343 |
| 5,091,942 A | 2/1992 | Dent | |
| 5,148,485 A | 9/1992 | Dent | |
| 5,282,250 A | 1/1994 | Dent et al. | |
| 5,390,245 A | 2/1995 | Dent et al. | |
| 5,425,058 A | * 6/1995 | Mui | 375/336 |
| 5,457,716 A | * 10/1995 | Ang | 455/182.3 |
| 5,539,730 A | 7/1996 | Dent | |
| 5,548,813 A | 8/1996 | Charas et al. | |
| 5,555,257 A | 9/1996 | Dent | |
| 5,559,886 A | 9/1996 | Dent et al. | |
| 5,566,168 A | 10/1996 | Dent | |
| 5,568,088 A | 10/1996 | Dent et al. | |
| 5,574,967 A | 11/1996 | Dent et al. | |
| 5,594,941 A | 1/1997 | Dent | |
| 5,619,210 A | 4/1997 | Dent | |
| 5,619,503 A | 4/1997 | Dent | |
| 5,638,024 A | 6/1997 | Dent et al. | |
| 5,694,420 A | * 12/1997 | Ohki et al. | 375/222 |
| 5,740,517 A | * 4/1998 | Aoshima | 455/38.3 |
| 5,978,366 A | * 11/1999 | Massingill et al. | 370/337 |
| 5,991,349 A | * 11/1999 | Chen | 375/355 |
| 6,084,905 A | * 7/2000 | Ishifuji et al. | 375/202 |

* cited by examiner

*Primary Examiner*—Steven Nguyen
(74) *Attorney, Agent, or Firm*—Coats & Bennett, PLLC

(57) ABSTRACT

A method and apparatus for demodulating a communication signal transmitted at a first rate is provided, wherein the communication signal includes a plurality of addresses and corresponding data packets. The demodulating method includes the steps of receiving the communication signal at a user terminal, identifying which of the plurality of data packets are destined to the receiving user terminal, and demodulating, at a second rate less than the first rate, only the data packets identified as being destined to the receiving user terminal.

14 Claims, 8 Drawing Sheets

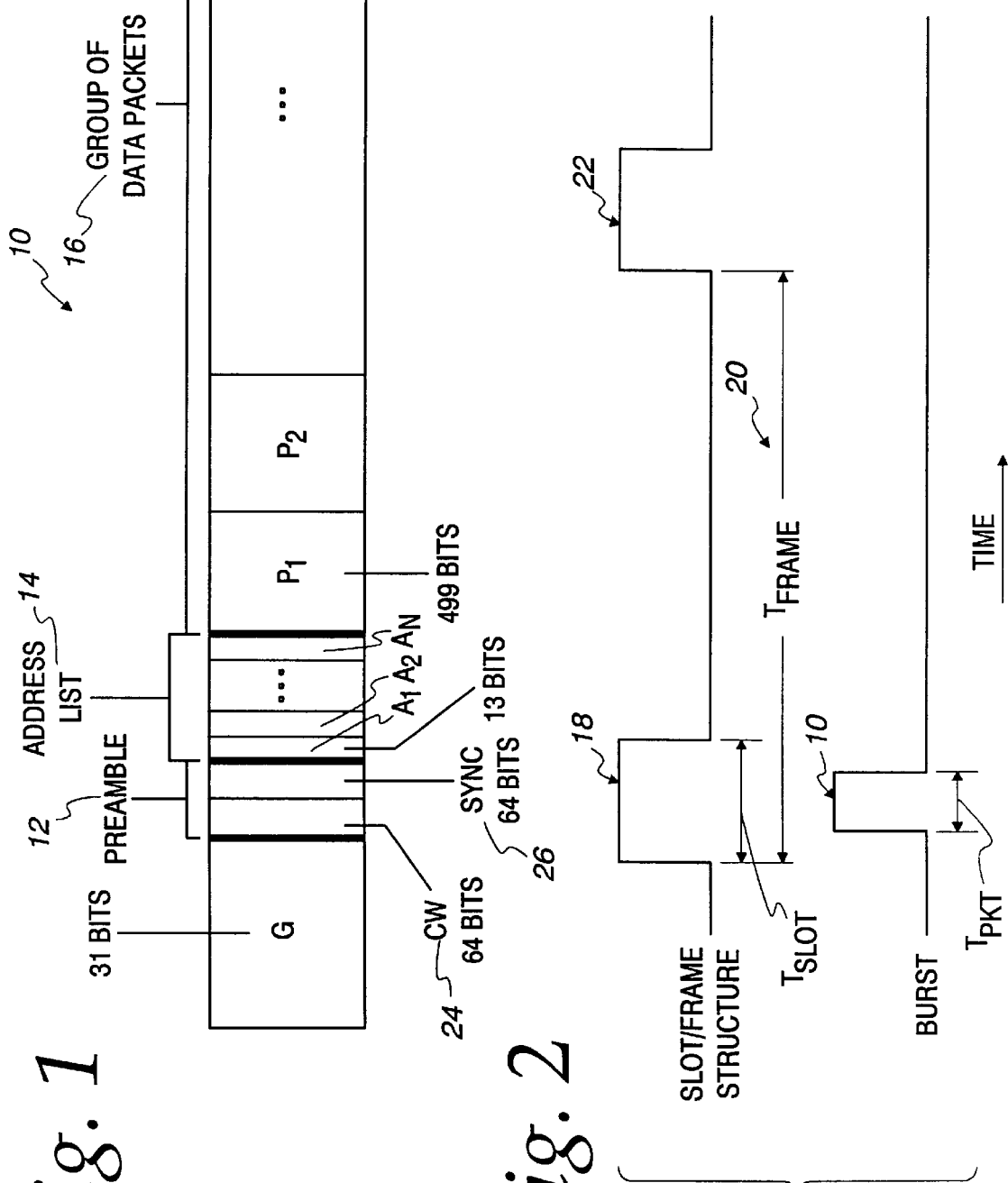

DEMODULATION METHOD AND APPARATUS IN HIGH-SPEED TIME DIVISION MULTIPLEXED PACKET DATA TRANSMISSION

FIELD OF THE INVENTION

The present invention is directed toward a method and apparatus for demodulating high speed Time Division Multiplexed signals and, more particularly, toward a method and apparatus for demodulating high speed Time Division Multiplexed signals by the use of an address list precursor.

BACKGROUND OF THE INVENTION

With the opening of higher radio frequency bands, such as a Ka band, to wireless communication systems (both terrestrial and satellite), the allocated bandwidth to individual systems has increased dramatically. For example, an award has been made of 1 GHz of spectrum, consisting of 500 MHz uplink and 500 MHz downlink, for broadband multi-media satellite services in the U.S. utilizing low earth orbiting satellites.

In a wireless communication system, where data packet switching is employed and Time Division Multiplexing is the selected mode of downlink access, it is advantageous to use a small number of broadband carriers in the downlink, as opposed to a large number of narrow band carriers. This means that the data packets destined for a multiplicity of earthbound user terminals are time multiplexed into a single broadband, high data rate carrier. However, the data demodulation rate at an individual user terminal may be desired to be much smaller than the carrier data rate, also referred to as the bearer data rate, to reduce demodulator complexity and cost. For example, an exemplary bearer data rate may be 500 Mbits/sec, where an exemplary demodulation rate at an individual user terminal may be 2 Mbits/sec.

A prior art method of demodulating Time Division Multiplexed (TDM) data packets consists of demodulating all data packets in the downlink carrier in real time. Accordingly, the user terminal demodulation rate has to be at least as great as the bearer modulation rate in order for complete demodulation to occur. The Inmarsat-C mobile satellite data transmission system is an example of such a system where the user terminal demodulation rate equals the bearer data, or modulation, rate. However, the bearer data rate in the Inmarsat-C is considerably lower (600 bits/sec) than applications of interest when transmitting in the higher radio frequency bands. Using the above example where a 500 Mbit/sec bearer data rate is implemented, "real time" demodulation, as provided by the Inmarsat-C, would mean that the user terminal would be required to have a 500 Mbit/sec demodulator. This sets the complexity and cost of the demodulator at the user terminal at a much higher level than if, for example, a 2 Mbit/sec demodulator were provided at the user terminal.

An alternative prior art method consists of utilizing a Time Division Multiple Access (TDMA) link, wherein the time axis is divided into frames, which are further subdivided into a multiplicity of slots. A plurality of receiver terminals are assigned to the time slots, one receiver to a slot, for a finite length of time on a demand basis. In this manner, each receiver needs to demodulate at only approximately the rate of R/M, where R is the bearer data rate and M is the number of slots per frame. This "less than bearer data rate" demodulation is possible because each receiver has exact knowledge of when its designated data packet will arrive, and therefore need not demodulate other segments of the received carrier. Although this technique allows for a reduction of the demodulation rate by a factor equal to the number of slots in a frame, typically by a factor of 7, the resulting required demodulation rate, typically 70 Mbits/sec, requires a demodulator still much greater in cost, complexity of implementation and power dissipation than a 2 Mbit/sec data rate demodulator.

The present invention is directed toward overcoming one or more of the above-mentioned problems.

SUMMARY OF THE INVENTION

A method of demodulating a communication signal transmitted at a first rate is provided, wherein the communication signal includes a plurality of addresses and corresponding data packets. The demodulating method includes the steps of receiving the communication signal at a user terminal, identifying which of the plurality of data packets are destined for the receiving user terminal, and demodulating, at a second rate, only the data packets identified as being destined for the receiving user terminal.

In one aspect, the step of identifying which of the plurality of data packets are destined for the receiving user terminal includes the steps of demodulating the plurality of addresses, and detecting which of the plurality of addresses matches the receiving user terminal address.

In another aspect, the step of receiving the communication signal at the user terminal includes the steps of writing the received communication signal to a memory in the user terminal, and reading the communication signal from the memory for demodulation.

In another aspect, the second rate is less than the first rate.

In another aspect, the communication signal includes a TDM signal.

In another aspect, the communication signal is transmitted from an Earth-orbiting satellite.

In another aspect, the plurality of addresses and corresponding data packets are arranged by grouping the plurality of addresses together followed by the plurality of data packets.

In another aspect, the plurality of addresses and corresponding data packets have a one-to-one correspondence.

In another aspect, the plurality of addresses and corresponding data packets are arranged in an interleaved manner, wherein each address is immediately followed by its corresponding data packet.

In another aspect, the first rate is approximately 500 Mbits/sec.

In another aspect, the second rate is approximately 2 Mbits/sec.

In another aspect, the communication signal further includes a preamble having a continuous wave segment followed by a synchronization word, wherein the demodulating method further includes the steps of detecting a presence of energy in the continuous wave segment of the preamble, the detection of energy indicating receipt of the communication signal at the user terminal, and filtering the synchronization word with a matched filter at the user terminal to confirm the detection of energy in the continuous wave segment.

In yet another aspect, the continuous wave segment includes an unmodulated, pure carrier wave.

In still another aspect, the synchronization word includes a bit pattern having a zero correlation with a shift in itself.

An apparatus is also provided for demodulating a communication signal received at a user terminal at a first rate, wherein the communication signal includes a plurality of addresses and corresponding data packets. The apparatus includes a digital memory receiving and storing the sampled and digitized communication signal at the first rate, an address list preprocessor receiving only the signal samples corresponding to the plurality of addresses from the memory, demodulating the plurality of addresses, and detecting which of the plurality of addresses matches the receiving user terminal address, and a demodulator receiving only the signal samples corresponding to the data packets from the memory whose corresponding addresses match the receiving user terminal address, and demodulating the received data packets at a second rate less than the first rate.

In one aspect, the apparatus further includes a memory manager controlling operation of the memory.

In another aspect, the communication signal is transmitted from an Earth-orbiting satellite.

In another aspect, the communication signal includes a preamble having a continuous wave segment followed by a synchronization word, the apparatus including means for detecting the presence of energy in the continuous wave segment of the preamble, the detection of energy indicating receipt of the communication signal at the user terminal, and means for detecting the synchronization word to confirm the detection of energy in the continuous wave segment.

In yet another aspect, the apparatus includes means for detecting the synchronization word in real time by a real time matched filter.

In still another aspect, the apparatus includes means for detecting the synchronization word in non-real time by a non-real time matched filter operating on stored samples of the synchronization word.

An object of the present invention is to provide a method of demodulation for high speed TDM packet data while reducing the complexity and the power dissipation of the demodulator at the user terminal so as to approach those of a demodulator that continuously demodulates only its own data.

Another object of the present invention is to provide a demodulation system capable of demodulating high speed TDM packet data while maintaining a reduction in the complexity and power dissipation of the demodulator at the user terminal so as to approach those of a demodulator that continuously demodulates only its own data, and not data destined for another user terminal.

Other aspects, objects and advantages can be obtained from a study of the application, the drawings, and the appended claims.

BRIEF DESCRIPTION OF THE DRAWINGS

FIG. 1 illustrates a first burst transmission which enables low rate demodulation in the user terminal;

FIG. 2 illustrates timing diagrams depicting the relationships between a frame, a slot and a burst;

DETAILED DESCRIPTION OF THE PREFERRED EMBODIMENTS

Figure 3:
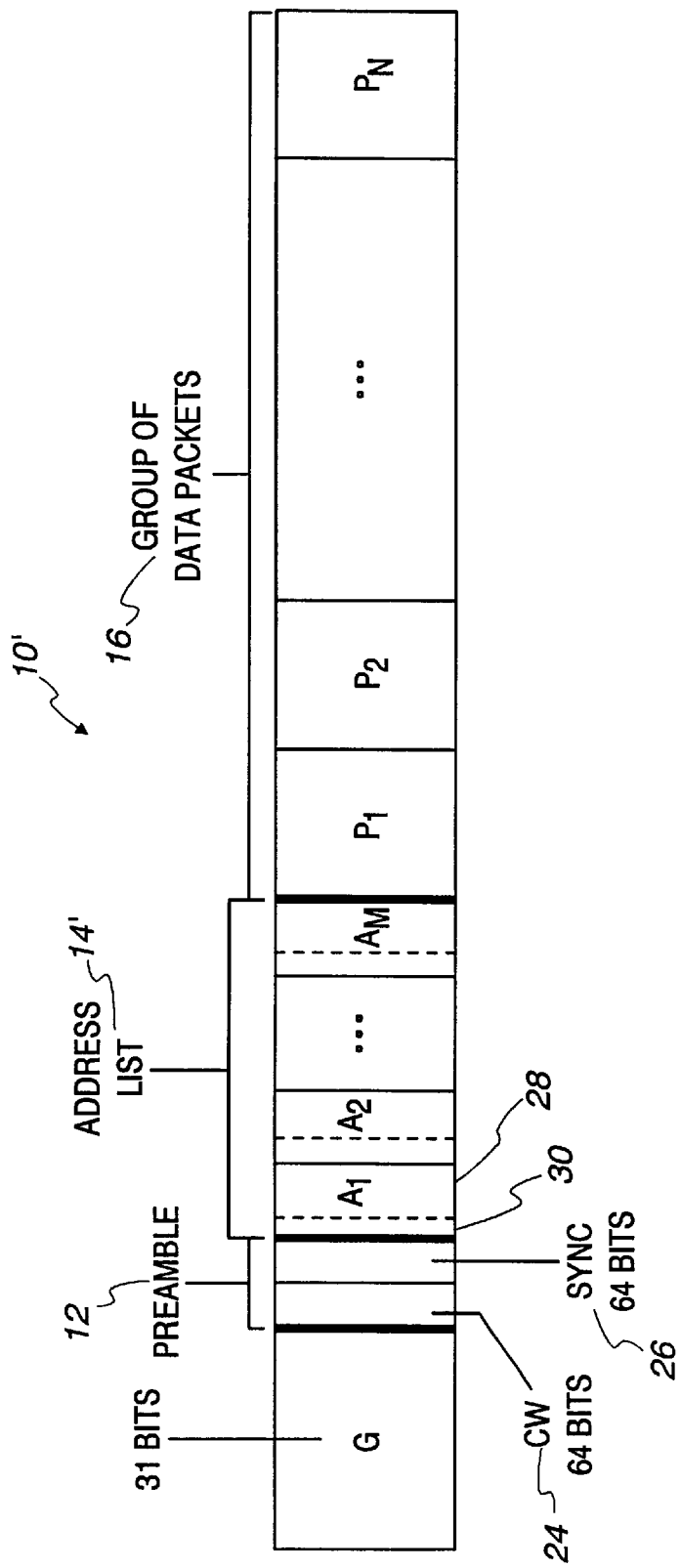
FIG. 3 illustrates a second burst transmission which enables low rate demodulation in the user terminal.

In wireless communication, e.g., from an Earth-orbiting satellite to an Earthbound user terminal, or between distant Earthbound user terminals, data packets for several user terminals are time multiplexed together and transmitted at a generally high bit rate, which may approximate 500 Mbits/sec. The data packets include all the information which is to be sent to various user terminals, with each data packet containing a corresponding address of a user terminal where it is to be transmitted. In an exemplary form, the addresses and corresponding data packets are multiplexed together and transmitted at a generally high bit rate of approximately 500 Mbits/sec. It should be understood that the reference herein to a 500 Mbit/sec transmission rate is meant for illustrative purposes only, and is not meant to impose any limitations.

It should be understood that if different uplink and downlink formats are used, i.e., narrow band TDMA for the uplink and wide band TDM for the downlink, and direct terminal-to-terminal communication via the satellite relay is employed, then the satellite must perform format conversion on board. Various suitable satellite techniques for receiving narrow band TDMA signals from terminals and reformatting them into wide band TDM signals for transmission to terminals may be implemented.

At the user terminal, continuous demodulation of the received signal is costly. Further, continuous demodulation of a signal received at 500 Mbits/sec is extremely difficult since correlation with the known bit patterns at the beginning of the transmitted signal, ie., the timing marker, is required every 2 nano-seconds, or bit shift. Still further, continuous demodulation is also unnecessary, since a high percentage of the time the signal received at one user terminal is intended for another user terminal and need not be demodulated.

It is advantageous from the viewpoint of minimizing the complexity of satellite payload to utilize asynchronous TDM, or ATDM, in the downlink, whereby the exact time of transmission of a burst of data packets to a user terminal is unknown except within a conventional slot time period $T_{slot}$, which may be much longer than the time period $T_{pkt}$ during which the data packets addressed to the particular user terminal are transmitted.

FIG. 1 depicts a signal structure, commonly referred to as a burst, indicated generally as 10, including a preamble 12, an address list 14 ($A_1, A_2 \ldots A_N$), and a group of data packets 16 ($P_1, P_2 \ldots P_N$). The burst 10 is transmitted, in each burst transmission, to all user terminals in a given cell, which is a region on the Earth covered by a given satellite beam.

FIG. 2 are timing diagrams depicting the relationships between a frame, a slot and a burst. It should be noted that the time structure, i.e., the start point, end point and repetition period, of a slot 18 and a frame 20 are known to the receiver. The burst 10 to a given cell has unknown start and end times, except that the burst 10 must be contained within the boundaries of the slot 18 assigned to the particular cell, as is shown in FIG. 2. Further, there may be no burst to a given cell in some slots, as shown in the second slot 22 in FIG. 2. The unknown start and end times of the burst 10 make this form of time division multiplexing asynchronous, unlike synchronous time division multiplexing where the slot 18,22 is further subdivided into hierarchies of fixed-boundary subslots.

Referring back to FIG. 1, the preamble 12 and address list 14 are configured, at the satellite, as precursors to the group of data packets 16 in each burst transmission 10 to a given user terminal. The addition of the preamble 12 and address list 14 as precursors permits a sampled-data (digital) receiver to precisely identify particular data packets $P_1$, $P_2 \ldots P_N$ that embody the information bits destined for the particular user terminal.

The preamble 12 informs the user terminal that the burst 10 has been received. The preamble 12 includes a continuous wave (CW) segment 24, followed by a synchronization (sync) word 26. The CW segment 24 is preferably an unmodulated pure carrier wave, and in the embodiment shown in FIG. 1, includes 64 bits all of the same polarity.

The user terminal has a passive mode, during which no bursts are received, and the user, terminal simply listens to the forward downlink carrier for the onset of a burst. A narrow band filter in the user terminal detects the presence of energy in the CW segment 24 of the preamble 12, and conventionally "activates" the user terminal. The relatively long CW segment 24 (64 bits) maximizes the signal-to-noise ratio in a narrow band burst-detect decision device, thereby maximizing the probability of detection and minimizing the probability of false alarm.

The sync word 26 is then filtered with a matched filter to confirm the previous burst-detect decision based on the CW segment 24. The sync word 26 also enables the acquisition of initial phase, initial frequency offset, and symbol/frame timing, which are necessary for demodulation of the data bits. Preferably, the sync word 26 includes a pattern that is easily compared through a process of cross-correlation with an ideal sync pattern having a low auto-correlation function for time shifts greater than 1-bit.

The preamble 12 is followed by the address list 14, which consists of an ordered list of user terminal addresses $A_1$, $A_2 \ldots A_N$ corresponding to each data packet $P_1, P_2 \ldots P_N$ in the burst 10. The addresses are collected at the satellite and there is a one-to-one correspondence between the position of an address $A_1, A_2 \ldots A_N$ in the address list 14 and the position of a data packet $P_1, P_2 \ldots P_N$ in the group of data packets 16.

A first segment (not shown) of the address list 14 consists of a "number of packets" field, which precedes the first address entry $A_1$. This simplifies user terminal processing as it informs the user terminal of the size of the address list 14. The last address entry $A_N$ is followed by an error detection check sum (not shown) which enables the user terminal to determine if the address list 14 has been received error free.

The burst 10 also includes a conventional guard time segment G at the beginning. The guard time represents the period of time in which nothing of significance is transmitted, allowing the beam antenna at the satellite to switch directions. The 31-bit-length guard time G in FIG. 1 is provided generally to allow the transmitting equipment in the satellite to settle down and prepare for transmission.

Accordingly, a demodulator at a user terminal receiving the burst 10, first detects for the presence of energy in the CW segment 24. If energy is detected, the sync word 26 is compared with a matched filter to confirm the detection of energy in the CW segment 24 and activating the demodulator if so confirmed. Subsequently, the addresses $A_1$, $A_2 \ldots A_N$ are sequentially demodulated and processed to identify if any of the data packets $P_1, P_2 \ldots P_N$ in the transmitted burst 10 are destined for that particular user terminal. After the address list 14 is demodulated and processed, the demodulator skips over data packets not intended for the user terminal, and demodulates only those identified data packets intended for the user terminal.

For example, assume 14 data packets (N=14) are transmitted in the transmitted burst 10, with particular data packets $P_3$ and $P_8$ including information bits destined for the receiving user terminal. After processing the preamble 12 to detect and confirm that the burst 10 has arrived, the addresses $A_1, A_2 \ldots A_{14}$ are processed and data packets $P_3$ and $P_8$ are identified as being destined for the receiving user terminal. More specifically, the demodulator demodulates addresses $A_1, A_2 \ldots A_{14}$ and detects that addresses $A_3$ and $A_8$ match the receiving user terminal address. The demodulator then demodulates only data packets $P_3$ and $P_8$, skipping over data packets $P_1-P_2$, $P_4-P_7$, and $P_9-P_{14}$.

In the continuous time domain, the above-described method is equivalent to identifying the continuous time segments of the received burst 10 that embody the information bits destined for the particular user terminal. The user terminal need only demodulate relatively few additional bits over and above the bits that constitute its own data packets. This reduces the demodulation rate of the user terminal to a level close to that of its own packet data rate. Further, the number of bits dedicated to the address of an individual user terminal is generally a small fraction of the number of bits in the entire burst transmission; with a typical fraction being 3%. Thus, the demodulator need only demodulate 3% of the received burst transmission 10, plus whatever number of bits make up the data packets $P_1, P_2 \ldots P_N$ destined to the particular user terminal; considerably less than the entire burst transmission 10.

Further, it is not necessary to demodulate every bit in each of the addresses $A_1, A_2 \ldots A_N$. If it is assumed that "0" and "1" occur equally at the first address bit, then presumably fifty-percent (50%) of the time only the first bit of an address needs to be demodulated. Fifty-percent of the time the first bit of the address will not match the first bit of the user terminal address, and the demodulator can disregard the remaining bits and move on to the next address. The same holds true for the second, third, fourth, etc., bits of the addresses $A_1, A_2 \ldots A_N$.

When data is transmitted using both error correction coding and modulation, demodulation may have to be performed for all address bits, followed by decoding. However, error correction decoding may be terminated as soon as it is evident that it will not produce the receiving user terminal's address, e.g., when no state of a Viterbi decoder contains a bit pattern matching the receiving user terminal's address.

Demodulation of the address list 14 enables the user terminal to know exactly which data packets $P_1, P_2 \ldots P_N$ are intended for it, allowing it to ignore the rest of the non-intended data packets $P_1, P_2 \ldots P_N$. In summary, by knowing the following: (a) the time of the onset of the burst 10; (b) the size of each data packet $P_1, P_2 \ldots P_N$; and (c) the sequence number(s) of its own data packet(s) in the group of data packets 16 in the burst 10, the user terminal locates the exact time-segments of the received burst 10 that it needs to demodulate. In an ATM protocol, the length of the group of data packets 16 is known to the user terminal as all data packets $P_1, P_2 \ldots P_N$ have the same length. However, if the length of the group of data packets 16 is unknown, the above method will still work provided the address list 14 has a field specifying the length of each data packet $P_1, P_2 \ldots P_N$, in addition to the addresses and any other fields.

An alternate address list construction scheme is illustrated in FIG. 3. In this alternate construction scheme, a plurality of data packets for the same user terminal are grouped in a continuous sequence. The burst 10' may have one or more sequences for each user terminal. In this alternative scheme, the number of entries $A_1, A_2 \ldots A_M$ in the address list 14' is less than the number of data packets $P_1, P_2 \ldots P_N$ in the group of data packets 16, with each address list entry $A_1, A_2 \ldots A_M$ corresponding to a contiguous sequence of n data packets $P_1, P_2 \ldots P_N$ addressed to the same user terminal. Each address list entry $A_1, A_2 \ldots A_M$ has two fields, an address field 28 and a "number of contiguous data packets equals n" field 30. There could be several address list entries for the same user terminal owing to the presence of several, non-contiguous data packets addressed to the same user terminal. It is not required in this alternative scheme for the satellite payload to enforce contiguity among all data packets $P_1, P_2 \ldots P_N$ addressed to a single user terminal, as this would increase the necessary payload capacity of the satellite. While this alternative scheme requires more user terminal processing, it offers a potential reduction of the transmission overhead contributed by the address list 14', particularly when the burst 10' is dominated by transmissions to a few users.

Demodulation of the burst 10' is performed in the same manner as previously described. More specifically, detecting and checking that the burst 10' has arrived at the user terminal via the CW segment 24 and sync word 26, identifying which of the data packets $P_1, P_2 \ldots P_N$ are destined to the user terminal by sequentially demodulating and detecting the addresses $A_1, A_2 \ldots A_M$ in the address list 14' which match the user terminal address, and demodulating only those data packets identified as being destined to the user terminal.

Channel capacity may be maximized, in both of the above-described forms of address list construction, by excising the user terminal address, and data packet length in the case of variable data packet lengths, from the transmitted data packets. On the other hand, satellite payload processing complexity may be minimized by leaving the transmitted data packets unmodified and incurring some overhead increase by redundant transmission of the addresses and data packet lengths.

Figure 4:
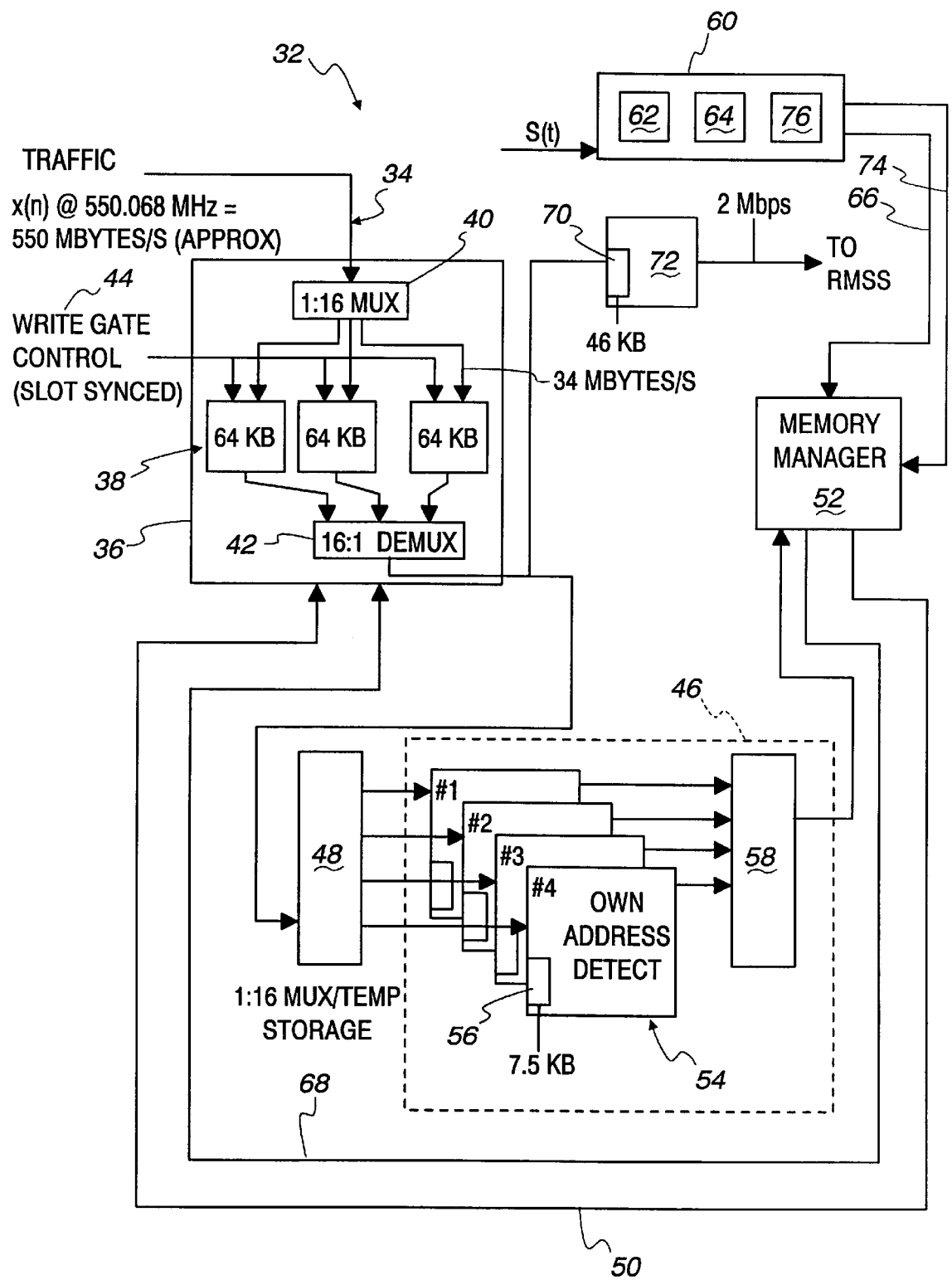
FIG. 4 is a block diagram of the functional architecture of a demodulator which enables low rate demodulation at the user terminal.

FIG. 4 depicts a block diagram of the functional architecture of a demodulator, indicated generally as 32, for demodulating a received burst 10,10' based on the above-described method. The burst 10,10', indicated as a traffic signal x(n), is transmitted from an A/D subsystem (not shown), and received by the demodulator at 34. The traffic signal x(n) carries sampled data at an exemplary rate of 550.068 million complex samples per second, with one complex sample per symbol and a symbol rate of 550.068× $10^6$ symbols per second. With four-bit A/D converters, the input data rate is approximately 550 Mbytes/sec.

The traffic signal x(n) is stored in the main sample memory 36, which consists of a parallel bank of memory chips 38, of exemplary 64 Kbyte memory, a multiplexer 40, of the exemplary ratio 1:16, and a demultiplexer 42, of the same ratio as the multiplexer 40. Since the memory chips 38 operate at READ and WRITE access rates lower than the 550 Mbytes/sec input rate, the use of a parallel bank of memory chips 38 is necessary.

Figure 5:
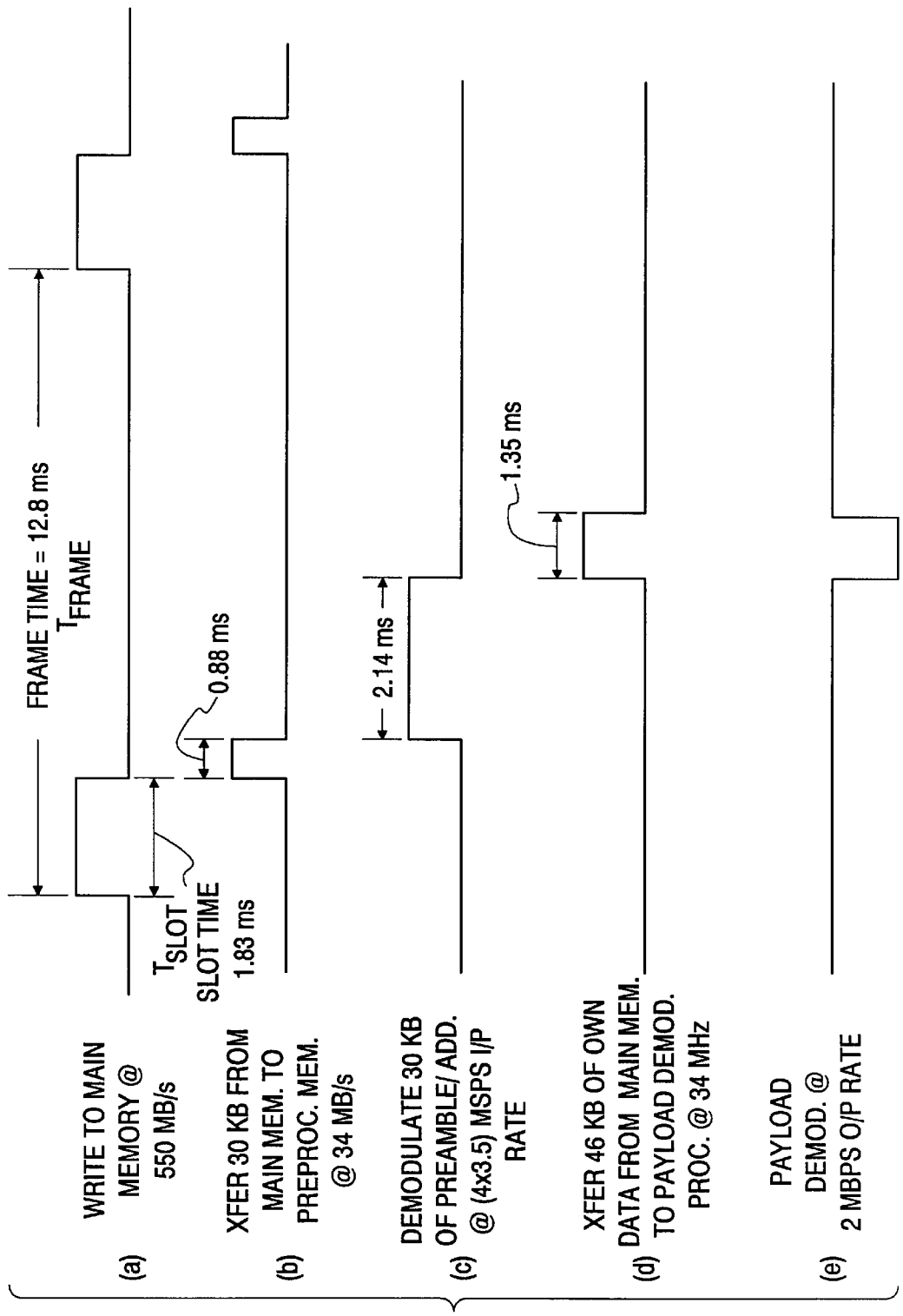
FIG. 5 illustrates timing diagrams for demodulation of a received burst transmission by the demodulator functional architecture of FIG. 4.

Referring to FIGS. 4–5, and more particularly FIGS. 4–5(a), the WRITE event to the main memory 36 is controlled by a conventional write gate control signal 44, and is started/stopped by the beginning/end of the known slot period, within which period the burst transmission 10,10' occurs.

The memory location of the start of the burst 10,10' is accurately identified by the process of matched filtering on the sync word 26. This matched filtering involves comparing the received signal with different time-shifted versions of the stored sync word 26 through the process of cross-correlation and identifying the time shift corresponding to the maximum correlation. The matched filtering may be performed in real time, such that there is no storage of the received signal for off-line computation of the cross-correlations. The matched filter may be conveniently implemented as a Surface-Acoustic-Wave (SAW) transversal filter, which operates on the analog IF signal prior to A/D conversion. It is also possible to implement the real time matched filter after A/D conversion in a high speed digital filter. At the time instant corresponding to the cross-correlation peak of the matched filter, an interrupt pulse is provided to the digital demodulator, thereby time tagging the Time-of-Arrival (ToA) of the burst. Knowledge of the ToA of the burst allows a memory map to be constructed between real time and memory location in the main memory 36.

Referring to FIGS. 4–5, at the end of the slot time, the samples embodying the address list 14,14' are transferred (FIG. 5(b)) from the main memory 36 through demux 42 to an address list preprocessor 46 via a temporary storage 1:16 multiplexer 48, under the control (signal 50) of the memory manager 52. The address list preprocessor 46 demodulates (FIG. 5(c)) the address list 14,14' and includes an array of address detectors 54 each having a memory 56, followed by a results combiner 58. Address detectors 54 may be efficiently implemented in ASICs.

The sequence number(s) of the data packets $P_1, P_2 \ldots P_N$ destined for the user terminal are forwarded by the address list preprocessor 46 to the memory manager 52. The memory manager 52 also receives an input from a preamble detect circuit 60. The preamble detect circuit 60 receives the analog IF signal s(t) and includes the narrow band filter 62 detecting the presence of energy in the CW segment 24, and the matched filter 64 confirming, via the sync word 26, the previous burst-detect decision based on the CW segment 24. The burst ToA interrupt pulse from the preamble detect circuit 60 to the memory manager 52 is carried on signal 74. The preamble detect circuit 60 also provides the memory manager 52, via signal 66, data relating to the acquisition of initial phase, initial frequency offset, and symbol/frame timing.

Knowing the memory location start of the burst 10,10' and the sequence number, in the sequence of all data packets 16 in the burst 10,10', of a user terminal's own data packets allows the memory manager 52 to identify precisely which samples stored in the main memory 36 need to be demodulated to read the user terminal's own data packets. Under the control of the memory manager 52, via signal 68, these samples are transferred (FIG. 5(d)) from the main memory 36 to the local memory 70 of the user terminal's own-data demodulator 72. The demodulator 72 may be efficiently implemented in an ASIC and operates quasi-continuously, demodulating (FIG. 5(e)) at its own data rate, for example, 2 Mbits/sec. The only interruption to the demodulation performed by the demodulator 72 is caused by the downloading of samples from the main memory 36.

FIG. 5 illustrates exemplary timing diagrams for the above-described sequence of events. The frame time between burst transmissions is indicated to be 12.8 milliseconds. Timing diagram (a) depicts writing, at 550 Mbytes/sec, the received burst 10 to the main memory 36 during the slot time $T_{slot}$ of 1.83 milli-seconds. At the end of the slot time, the preamble 12 and address list 14 are transferred from the main memory 36 to the preprocessor 46 (timing diagram (b)). Following the transfer, the preamble 12 and address list 14 are demodulated at a rate considerably less ((4×3.5) Msymbols/sec) than the 550 Mbytes/sec input rate (timing diagram (c)).

The specific data packets $P_1, P_2 \ldots P_N$ which need to be demodulated, i.e., identified as being destined to the user terminal, are then transferred from the main memory 36 to the local memory 70 of the user terminal's demodulator 72 (timing diagram (d)), and demodulated at the considerably lower rate of 2 Mbit/sec (timing diagram (e)). All pertinent data packets $P_1, P_2 \ldots P_N$ should be transferred out of the main memory 36 prior to receiving the next burst 10 to ensure proper operation.

Figure 6:
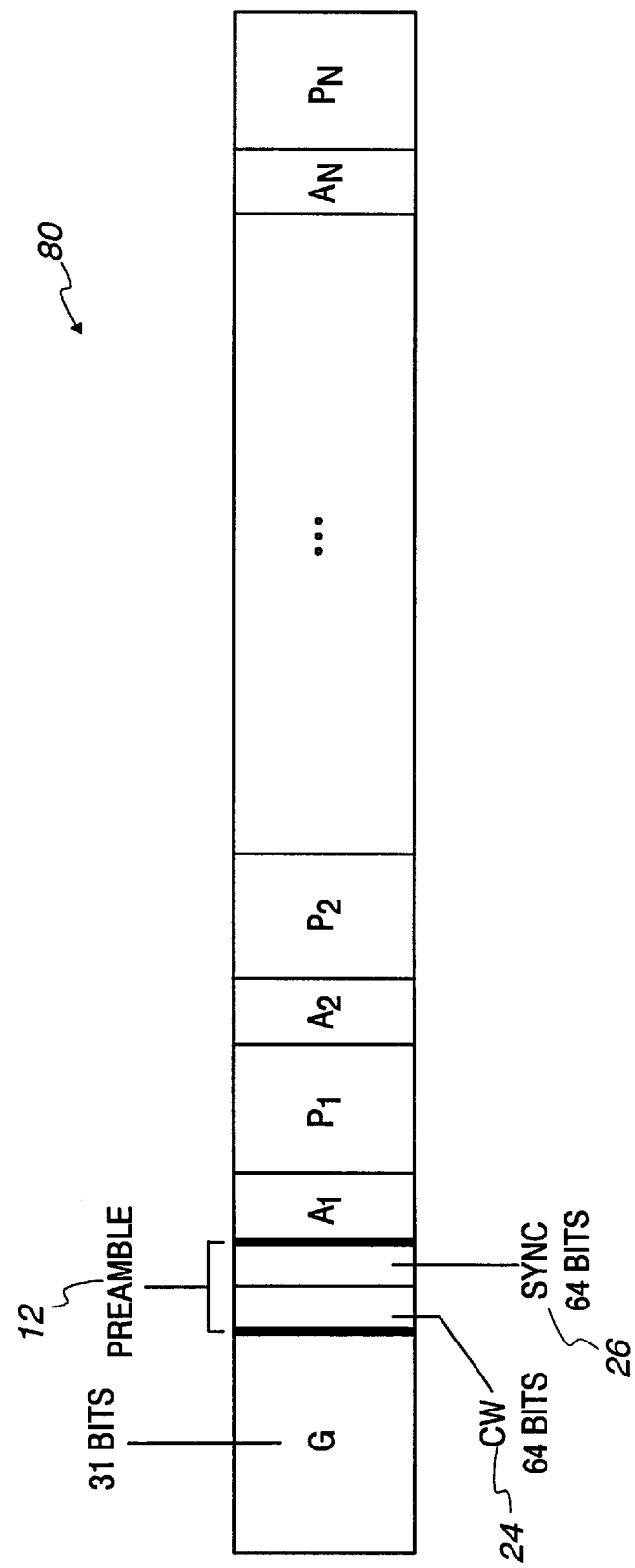
FIG. 6 illustrates a third burst transmission which enables low rate demodulation in the user terminal.

FIG. 6 depicts yet another alternative burst transmission, i.e., third burst transmission, indicated generally as 80, which can be utilized with the above-described demodulator and demodulating method. The burst transmission 80 includes the same guard bits G, CW segment 24 and sync word 26 as included in the burst transmissions 10,10' shown in FIGS. 1 and 3. The only difference is that the addresses $A_1, A_2 \ldots A_N$ and data packets $P_1, P_2 \ldots P_N$ of burst 80 are arranged in an interleaved manner, wherein each address $A_1$, $A_2 \ldots A_N$ is immediately followed by its corresponding data packet $P_1, P_2 \ldots P_N$. For fixed length data packets, the memory manager 52 has exact knowledge of the locations of the terminal address fields of all received data packets. This knowledge is used to first read only the terminal addresses $A_1, A_2 \ldots A_N$ for each data packet $P_1, P_2 \ldots P_N$. As previously described, only if an address is detected as matching the user terminal address is the corresponding data packet demodulated. Accordingly, the burst transmission 80 of FIG. 6 permits a low data rate demodulator to be utilized for demodulating only limited segments of the received burst 80, but avoids the addition of an address list 14,14' as shown in FIGS. 1 and 3. While this approach requires less processing in the satellite payload (no separate address list needed), it requires more processing in the user terminal. It also eliminates the possibility of incorporating exceptionally robust error detection and/or correction coding in the address list, which is beneficial for reducing demodulator workload.

It should be understood that various modifications could be made without departing from the spirit and scope of the present invention. As examples only, two alternative modifications of the above-described invention are provided below.

Figure 7:
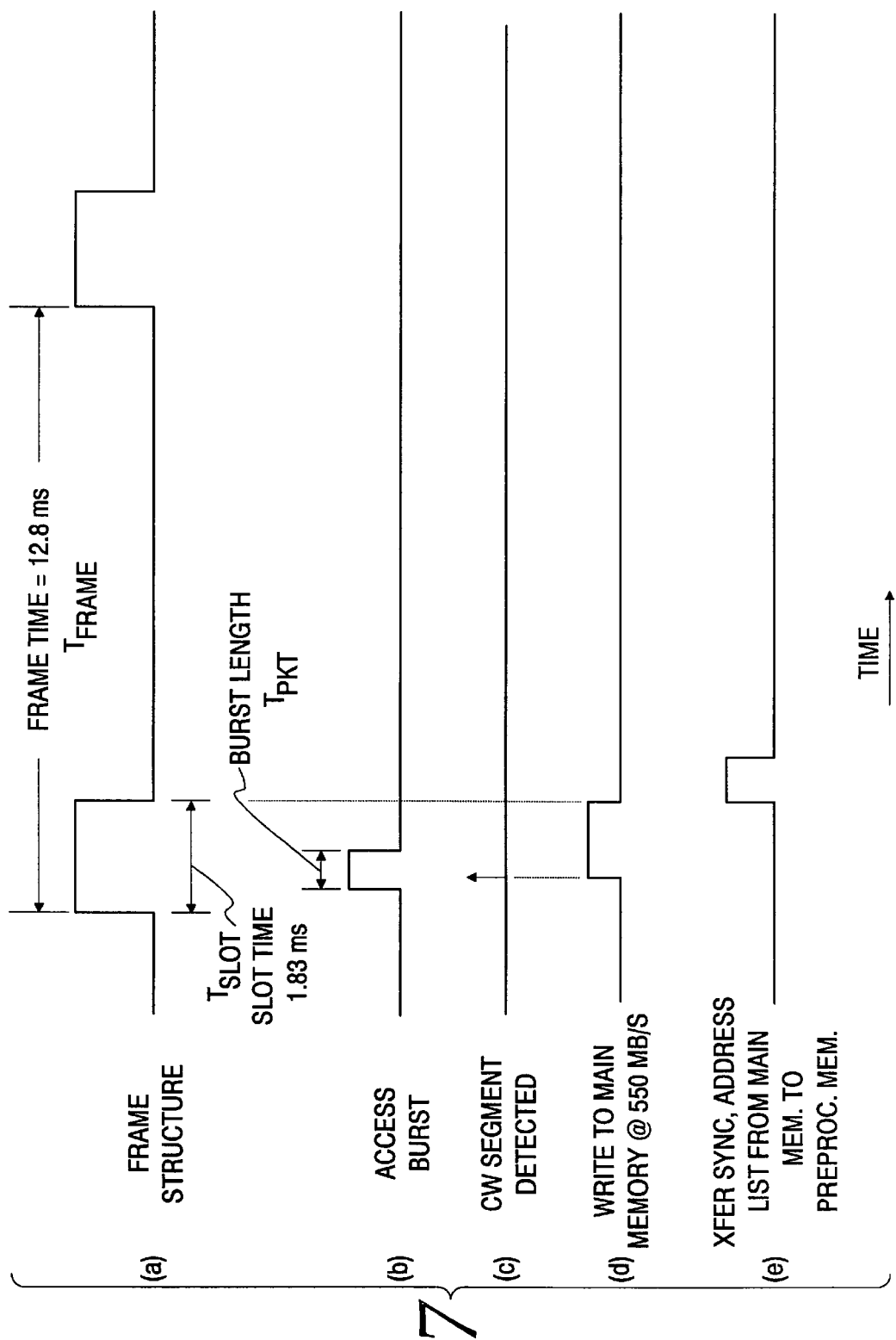
FIG. 7 illustrates timing diagrams for a first alternative demodulation of a received burst transmission by the demodulator functional architecture of FIG. 4.

In a first alternative demodulation scheme, as illustrated in the timing diagrams of FIG. 7, the start of the WRITE event to the main memory 36 is triggered, not by the start of a slot as shown in FIG. 5(a), but by the detection of the CW segment 24 (FIGS. 7(c–d)). The end of the WRITE event, however, coincides with the end of the slot (FIGS. 7(a) and (d)), as in the basic embodiment described previously and illustrated in FIG. 5(a). This is described in greater detail below.

One factor which can influence the cost of a terminal is the amount of power taken by the processing circuits on average, and the consequent need to dissipate heat. If mean power can be kept below the level at which a cooling fan would be needed, the cost of cooling can be reduced. It will now be described how the CW segment 24, or unmodulated part of the preamble 12, and the sync word 26, address list 14,14' and data packets 16, together forming the modulated part of the burst 10,10', are used to minimize power consumption. Within the modulated part of the burst 10,10', the sync word 26 generally includes a known symbol pattern, while the address list 14,14' and data packets 16 generally include an unknown symbol pattern.

In the "idle" mode, while waiting for a signal burst from the satellite or other signal transmission device, such as, but not limited to, terrestrial signal transmission devices, the high-speed A/D converter (not shown) and the initial sync correlator, or matched filter 64, can be powered down to save power. Only the CW segment detector 62 need be operative. The CW segment detector 62 may be made to consume comparatively little power by using an analog circuit. For example, a narrow band IF filter may be provided with a bandwidth of the order of 64-times narrower than the main receiver filter (not shown), due to the fact that CW segment 24 includes 64 like symbols in a row. The main IF filter (not shown) for a 550 Mbytes/sec GMSK transmission would be of the order of 400 MHz wide, while the narrow band filter 62 may be of the order of 400/64≈6 MHz wide. The signal-to-noise ratio in the narrow band filter 62 is thus higher by a factor of 64, or 18 dB, than the signal-to-noise ratio of individual data symbols, assisting detection.

The narrow band filter 62 may include a simple diode detector to rectify the CW segment 24 to provide a signal amplitude indication. The rectified signal is applied to a threshold detection device, such as a Scmitt trigger. The detect, or trigger, threshold is set so that false triggering on noise occurs with negligible frequency, but so that triggering occurs with near certainty upon occurrence of a CW segment 24 burst at signal levels sufficient for good data detection, i.e., at above 18 dB signal-to-noise ratio in the narrow bandwidth, and thus above 0 dB signal-to-noise ratio in the data modulation bandwidth.

Upon the detection trigger device providing an output indicative of the presence of the CW segment 24, the fast A/D converter is enabled to digitize the received signal and transfer samples to the main memory 36. In parallel, the 64-bit sync correlator, or matched filter 64, is enabled to process signal samples to search for the presence of the sync word 26. If the sync word 26 is not detected within a given time interval after the CW segment detector 62 last detected an above-threshold energy in the narrow band filter 62, the receiver is returned to the power-down state where it awaits detection of the CW segment 24 once more.

On the other hand, if the 64-bit sync correlator 64 detects the 64-bit sync word 26, the A/D converter will be allowed to continue writing samples into main memory 36 for a defined period corresponding to the maximum possible length of burst 10. The sample count, or index, at which the sync word 26 was detected may also be written to the main memory 36 or otherwise recorded for future use by the demodulator and decoder as a START marker. This START marker allows the demodulator to identify precisely the address in the main memory 36 corresponding to the first signal sample to be demodulated to retrieve information. This first retrieved information may include the number of addresses, followed by the addresses in sequence.

Address decoding of a particular address terminates when it is evident that the decoded address will not match the terminal's own address. The demodulator and decoder then skips to the beginning of the next address and commences demodulating and decoding that next address. Address decoding terminates when all addresses have been decoded or skipped, or, in the case that the address of a terminal is constrained to occur only once in the address list 14,14', address decoding may terminate upon detecting that a decoded address matches the terminal's own address. The demodulator can then predict, from the number of the address which matched its own address, which packet number in the sequence of data packets 16 is intended for that terminal. Intervening signal samples, corresponding to other addresses or data packets intended for other terminals, are then skipped and samples corresponding only to data packets intended for the identified terminal are processed to demodulate and decode the data. In the above-described way, the sequential use of the CW segment 24, the sync word 26 and the address list 14,14' to turn on the full processing power of the receiver only during selected time periods, significantly reduces the mean processing speed requirements and consequently the power consumption and cooling requirements, all of which contribute to a reduction in cost and complexity of the terminal.

A notable advantage of the first alternative demodulation method over the basic demodulation method is that the first alternative demodulation method allows parts of the receiver, such as the A/D converter, to be in a power-saving mode until a burst 10 is received. In contrast, in the basic demodulation method, the A/D converters always WRITE to the main memory 36 for the entire duration of each slot.

Figure 8:
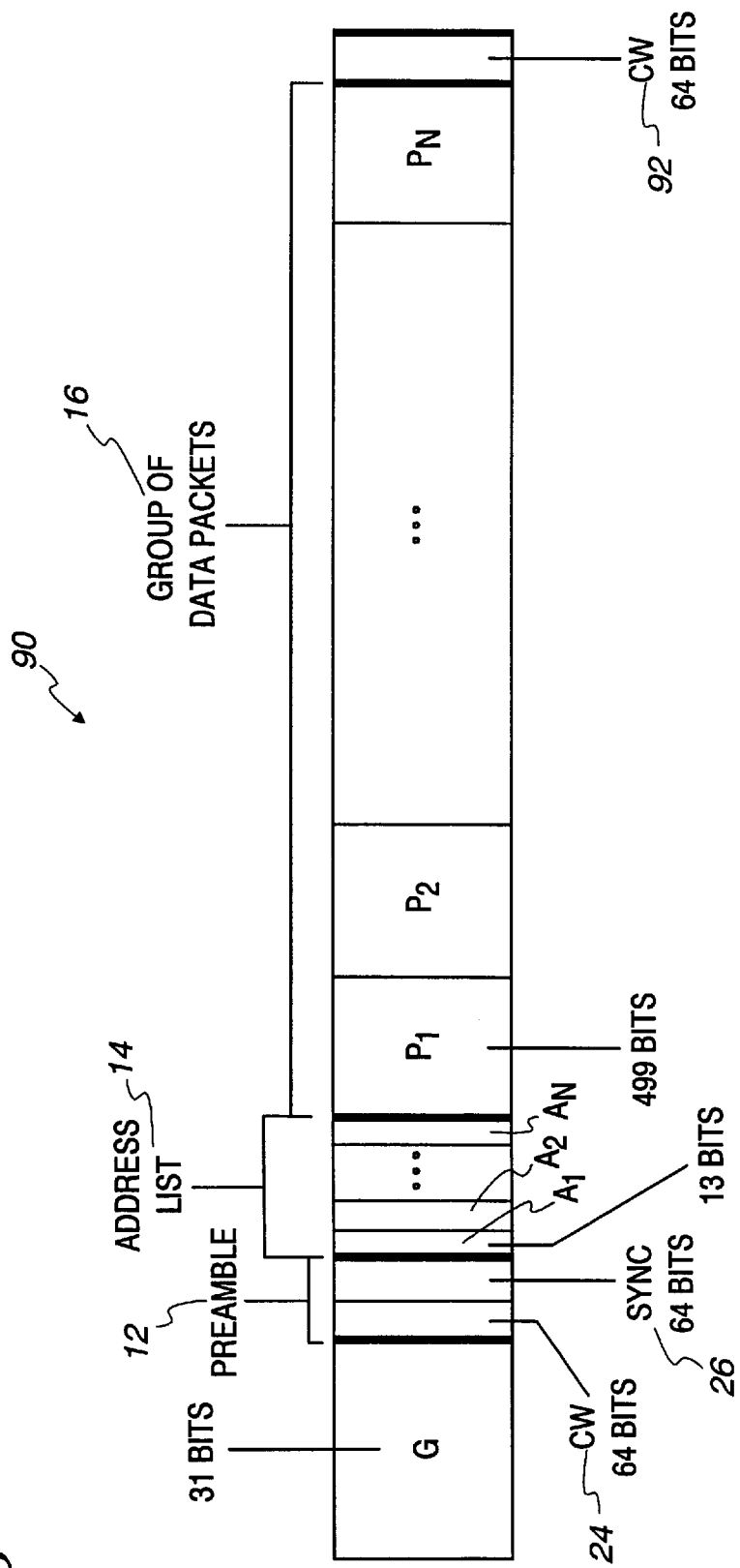
FIG. 8 illustrates a fourth burst transmission which enables low rate demodulation in the user terminal.

FIG. 8 depicts still another alternative burst transmission, i.e., fourth burst transmission, illustrated generally as 90, which can be utilized with the abovedescribed demodulator and demodulating methods. The burst transmission 90 is basically the burst transmission 10 of FIG. 1, including an additional end-of-burst CW segment 92 introduced at the end of the burst 10, i.e., after the group of data packets 16. To avoid ambiguity, the end-of-burst CW segment 92 may have a different center frequency than the CW segment 24. This allows the WRITE event to be terminated by the detection of the end-of-burst CW segment 92, rather than by the end of the slot, which further shortens the power-up mode of the A/D converter. Considerations for implementing the detection circuit 76 for the end-of-burst CW segment 92 are identical to those for the detection circuit 62 for the CW segment 24. Accordingly, a detailed discussion is not necessitated.

It should be noted that while FIG. 8 illustrates the end-of-burst CW segment 92 introduced at the end of burst 10, the end-of-burst CW segment 92 may also be introduced at the end of bursts 10' and 80 providing similar operation. That is, terminating the WRITE event upon detection of the end-of-burst CW segment 92, rather than by the end of the slot.

Figure 9:
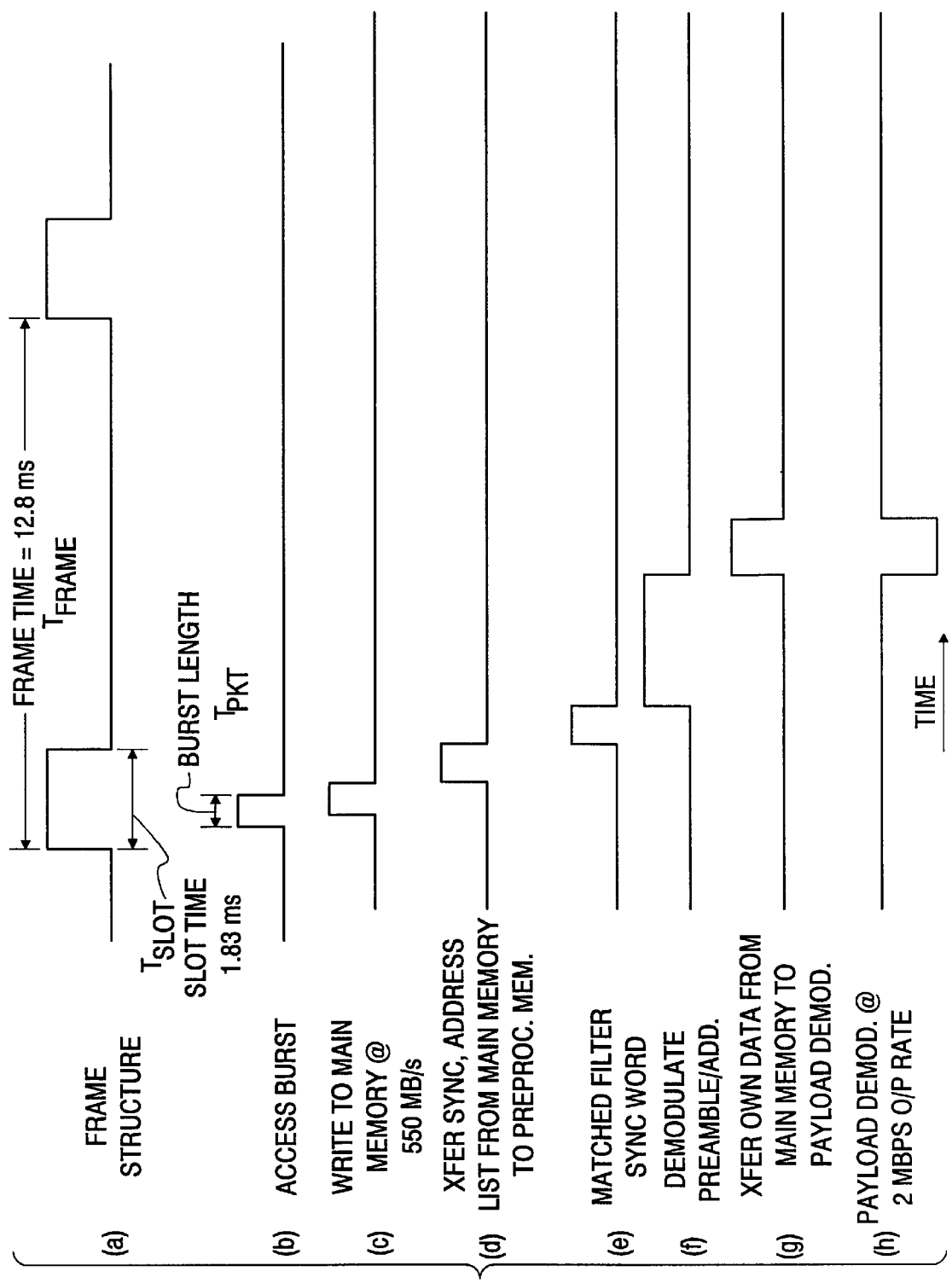
FIG. 9 illustrates timing diagrams for a second alternative demodulation of a received burst transmission by the demodulator functional architecture of FIG. 4.

In a second alternative demodulation scheme, as illustrated in the timing diagrams of FIG. 9, the sync word 26 is not matched filtered in real time. Instead, this operation is performed in non-real time as a first task before non-real time demodulation of the address list 14,14', using the processing resources of the address list preprocessor 46. Timing diagrams for this second alternative demodulation scheme are illustrated in FIG. 9, where the WRITE event (FIG. 9(c)) to the main memory 30 is controlled according to the principles set forth with respect to the fourth burst transmission 90 described above. More specifically, the WRITE event is turned on by the detection of the first CW segment 24 and turned off by the detection of the end-of-burst CW segment 92, via the preamble detect circuit 60. It should be noted that eliminating real time matched filtering of the sync word 24 reduces receiver cost and power dissipation, as the non-real time matched filtering can be done for a small increase in complexity of the address list preprocessor 46. After the sync word 24 is matched filtered in non-real time at FIG. 9(e), demodulation occurs at FIGS. 9(f–h) as previously described with respect to FIG. 5, and a detailed discussion is not necessary.

While the present invention has been described with particular reference to the drawings, it should be understood that various modifications could be made without departing from the spirit and scope of the present invention.

What is claimed is:

1. A method of demodulating a communication signal transmitted at a first rate, the communication signal including a plurality of addresses, corresponding data packets, a preamble having a first continuous wave segment followed by a synchronization word, and a second continuous wave segment following the plurality of addresses and corresponding data packets, said demodulating method comprising:

receiving the communication signal at a user terminal;

detecting a presence of energy in the first continuous wave segment of the preamble, said detection of energy indicating receipt of the communication signal at the user terminal;

filtering the synchronization word with a matched filter at the receiving user terminal to confirm the detection of energy in the first continuous wave segment;

writing the received communication signal to a memory in the receiving user terminal;

terminating the step of writing the received communication signal to a memory in the receiving user terminal is terminated upon detecting a presence of energy in the second continuous wave segment;

identifying which of the plurality of data packets are destined to the receiving user terminal;

reading from the memory only the data packets identified as being destined to the receiving user terminal; and demodulating, at a second rate less than the first rate, the data packets identified as being destined to the receiving user terminal.

2. The method of claim 1, wherein the first and second continuous wave segments have different center frequencies.

3. An apparatus for demodulating a communication signal received at a user terminal at a first rate, the communication signal including a plurality of addresses, corresponding data packets, a preamble having a first continuous wave segment followed by a synchronization word, and a second continuous wave segment following the plurality of addresses and corresponding data packets, said apparatus comprising:

a memory receiving and storing the communication signal at the first rate;

a preamble detect circuit detecting the presence of energy in the first continuous wave segment of the preamble, said detection of energy indicating receipt of the communication signal at the user terminal, and confirming the detection of energy in the first continuous wave segment via the synchronization word;

an address list preprocessor receiving only the plurality of addresses from the memory, said address list preprocessor demodulating the plurality of addresses and detecting which of the plurality of addresses matches the receiving user terminal address;

a demodulator receiving only data packets from the memory whose corresponding addresses match the receiving user terminal address, and demodulating said received data packets at a second rate less than the first rate; and an end detection circuit detecting the presence of energy in the second continuous wave segment, wherein the detection of energy in the first continuous wave segment initiates storage of the communication signal in the memory, and wherein the detection of energy in the second continuous wave segment terminates storage of the communication signal in the memory.

4. The apparatus of claim 3, wherein the first and second continuous wave segments have different center frequencies.

5. A method of demodulating a communication signal transmitted at a first rate, the communication signal including a preamble having a first continuous wave segment followed by a synchronization word, a plurality of addresses and corresponding data packets, and a second continuous wave segment following the plurality of addresses and corresponding data packets, said demodulating method comprising:

detecting a presence of energy in the first continuous wave segment of the preamble, said detection of energy indicating receipt of the communication signal at the user terminal;

writing the received communication signal to a memory in the receiving user terminal upon detecting energy in said first continuous wave segment;

filtering the synchronization word with a matched filter at the receiving user terminal to confirm the detection of energy in the continuous wave segment;

identifying which of the plurality of data packets are destined to the receiving user terminal;

reading from the memory only the data packets identified as being destined to the receiving user terminal;

demodulating, at a second rate less than the first rate, the data packets identified as being destined to the receiving user terminal; and terminating writing the received signal to memory upon detecting a presence of energy in the second continuous wave segment.

6. The method of claim 5, wherein the first and second continuous wave segments have different center frequencies.

7. In a digital wireless communication system having a transmitter using data packet switching to transmit a communications signal having data packets intended for a plurality of user terminals, the communications signal including user terminal addresses and corresponding data packets and transmitted at a first rate, a demodulating method, comprising:

receiving the communications signal at a user terminal;

stoning the communications signal in a memory;

transferring the terminal addresses from the memory to an address detector;

detecting the packet addresses intended for the receiving user terminal;

transferring data packets intended for the receiving user terminal from the memory to a data demodulator;

demodulating the data packets intended for the receiving user terminal at a second rate less than the first rate; and wherein the user terminal addresses comprise a series of bits and the addresses are error-correction coded before transmission, and the received addresses are detected and then decoded, and the decoding is terminated when it is evident that the address does not agree with the address of the receiving user terminal.

8. In a digital wireless communication system having a transmitter using data packet switching to transmit a communications signal in successive bursts at a first rate, each burst having a preamble with continuous wave and sync fields and data packets, a demodulating method, comprising:

receiving the communications signal at a user terminal, the terminal being in an idle mode with an inactive data packet demodulator;

detecting the continuous wave field;

detecting the sync field to verify receipt of the continuous wave field;

activating the data packet demodulator; and demodulating the data packets at a second rate less than said first rate.

9. The method of claim 8 including deactivating the data packet demodulator when all data packets intended for the receiving user terminal have been demodulated.

10. The method of claim 8 wherein the CW field is detected with a narrow band filter.

11. The method of claim 8 wherein the sync field is detected with a matching filter.

12. The method of claim 11 wherein the sync field is detected in analog form with an analog filter.

13. The method of claim 12 wherein the analog sync signal is filtered with a surface acoustic wave filter.

14. The method of claim 11 in which the sync signal is detected in digital form with a digital filter.

* * * * *

UNITED STATES PATENT AND TRADEMARK OFFICE
CERTIFICATE OF CORRECTION

PATENT NO. : 6,515,976 B1
DATED : April 6, 1998
INVENTOR(S) : Dent et al.

It is certified that error appears in the above-identified patent and that said Letters Patent is hereby corrected as shown below:

Column 12,
Line 36, delete "is terminated".

Signed and Sealed this

Tenth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,515,976 B1
DATED : February 4, 2003
INVENTOR(S) : Dent et al.

It is certified that error appears in the above-identified patent and that said Letters Patent is hereby corrected as shown below:

Column 12,
Line 36, delete "is terminated".

This certificate supersedes Certificate of Correction issued January 10, 2006.

Signed and Sealed this

Fourteenth Day of March, 2006

JON W. DUDAS
*Director of the United States Patent and Trademark Office*